United States Patent Office 3,589,011
Patented June 29, 1971

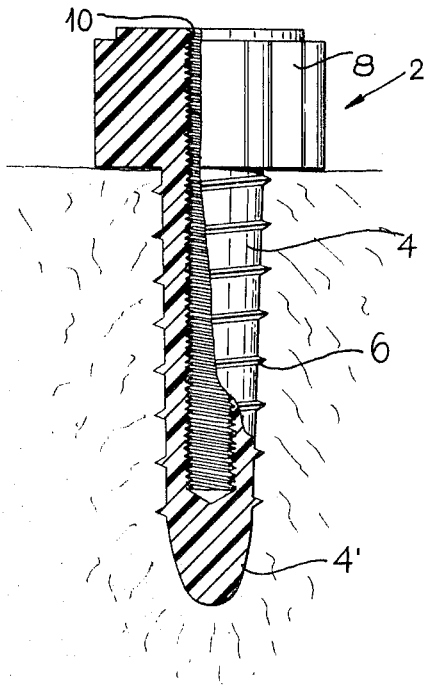
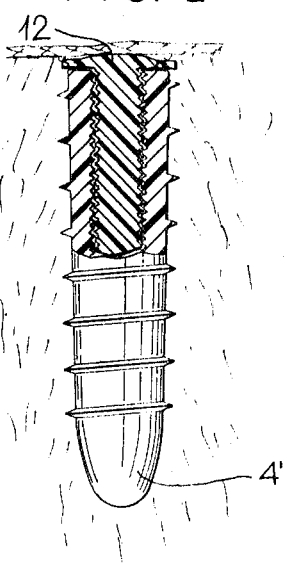
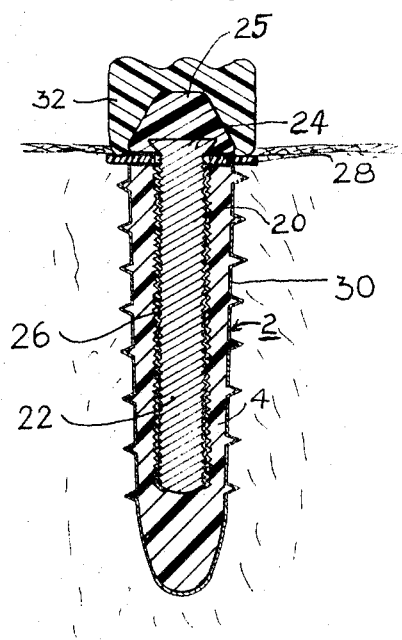

3,589,011
ENDOSSEOUS PIN DENTAL IMPLANT METHOD AND DENTAL DEVICES USED THEREIN
Meer Sneer, 24 Baalei Melacha St., Tel Aviv, Israel
Filed July 10, 1969, Ser. No. 840,711
Int. Cl. A61c 13/00
U.S. Cl. 32—10        4 Claims

ABSTRACT OF THE DISCLOSURE

An endosseous pin dental implant method comprises the steps of implanting into the patient's mouth a tissue-tolerant, externally-spiralled, foundation pin formed with an internally threaded bore, and after a length of time sufficient to permit the tissues to form around the foundation pin, threading into the bore the final implant pin. Also described are the foundation pin and the final implant pin used in such method.

BACKGROUND OF THE INVENTION

Field of the invention

The present invention relates to the endosseous pin dental implant method, and to dental devices used in the novel method.

Description of the prior art

Among the known dental implant techniques is one called the endosseous ("within the bone") pin implant method wherein one or more pins or posts are driven into the bone and are used as the base for a tooth crown, to support a denture, or for a similar function. The known endosseous pin implant techniques, however, are not always successful. One reason for failure is because the forces arising during chewing or biting are unduly concentrated on small areas of the bone. It is a characteristic of bone that it resorbs under pressure. This causes the implant to become loose and unstable, and eventually to fail.

The present invention aims to provide an endosseous pin implant method which produces a secure support for the implant and an equal distribution of the stresses, thereby lessening bone resorption and failure of the implant. The invention also provides dental devices used in the novel method.

SUMMARY OF THE PRESENT INVENTION

According to the present invention, an endosseous pin implant method is provided involving two stages. In the first stage, there is implanted in the patient's mouth a foundation pin formed with a longitudinal bore. The foundation pin is permitted to remain in place for a length of time (e.g. about two months) sufficient to permit the bone tissue growth to form around it. In the second stage, which is performed after this period of time has elapsed, the final implant pin is inserted into the bore of the foundation pin and is fixed therein. The final implant pin is used as the base for a tooth crown, to support a denture or for other like purpose.

The foundation pin is externally threaded or spiralled, and the bore thereof is internally threaded, the final implant pin being threaded into the bore of the foundation pin in the second stage. Also, the foundation pin before implant is one having an enlarged head, which head is removed after implant, and a temporary cap is applied to the top of the bore. This temporary cap is removed during the second stage when the final implant pin is inserted into the bore. The final implant pin is coated with a bonding agent before insertion into the bore of the foundation pin in the second stage.

Preferably also, a plastic sleeve is interposed between the final implant pin and the top of the foundation pin during the second stage.

This technique provides a support for the final implant pin which support, during biting or chewing, securely holds the final implant pin in position and distributes the stresses over a large surface; it also cushions the bone against shocks, when a cushioning bonding material or sleeve is used.

The invention also provides a novel foundation pin and a novel final implant pin for use in the above method.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates the first stage of the dental-implant method, wherein the foundation pin is implanted;

FIG. 2 illustrates the implant at the end of the first stage, namely when the enlarged head of the foundation pin has been removed and a temporary cap applied; and FIG. 3 illustrates the second stage of the method wherein the final implant pin has been inserted into the foundation pin.

DESCRIPTION OF THE PREFERRED EMBODIMENT

With reference to FIG. 1, there is shown the foundation pin, generally designated 2, implanted into the bone of the human jaw structure during the first stage of the method. Foundation pin 2 may be implanted in the alveoles of extracted teeth, or it can be implanted into holes drilled in the upper or lower mandibular bone. Pin 2 is made of a tissue-tolerant plastic, such as a hard nylon, or that sold under the trademark "Rilsan"; alternatively, it may be of a tissue-tolerant metal, such as tantalum, gold, nickel, cobalt, chromium, etc. It includes a shank 4 formed with external spirals or threads 6, and an enlarged head 8 protruding from the hole in the jaw structure. An internally threaded longitudinal bore 10 is formed through the shank 4 and head 8, the bore being open at its top and closed at its bottom.

After pin 2 is implanted, head 8 is severed and replaced by a screw 12 threaded into the top of bore 12, providing a temporary cap for the top of the bore. The bottom of the bore is of course permanently closed by the bottom shank portion 4'. Temporary cap 12 is preferably of a plastic, such as nylon, but may also be of any of the materials used for pin 2.

The second stage of the method is performed after a predetermined time has elapsed, such as about two months, sufficient to permit the bone tissue growth to form around shank 4 of pin 2. In the second stage the final implant pin 20 is inserted into bore 10 and fixed therein. Pin 20 includes an externally threaded shank 22 which is threaded into bore 10, and a head 24. The latter carries a cone 25 used as the support for a crown 32 of an artificial tooth to be implanted. Instead of implanting an artificial tooth, head 24 could carry a post support for a denture, or an element for another type of dental implant. Before shank 22 is inserted, it is coated with a known adhesive 26, such as a self-polymerizable plastic bonding agent (e.g., epoxy resin adhesives, unsaturated polyester resin adhesives) which not only provides a very firm bond between the final implant pin 20 and the foundation pin 2, but also cushions the shocks and lessens the possibility of unduly concentrating loads on the underlying bone during chewing or biting. One of the known hard dental cements can also be used if cushioning properties are not desired.

Preferably, but not necessarily, a plastic washer 28 is interposed between the head of pin 20 and the top of shank 4 of pin 2. Washer 28 must also be of a tissue-tolerant material and it should also be somewhat elastic, so as to help cushion the shocks or concentrated loads from pin 2 to pin 20 and to the underlying bone. One suitable material that may be used is polytetrafluoroethylene, sold under the trademark "Teflon." Instead of a washer 28, there may be used a coating of a self-polymerizable plastic or a dental cement, e.g. of the same material as coating 26.

If foundation pin 2 is made of a plastic, it may be coated with a tissue-tolerant metallic film 30 before implanted in the first stage, so as to provide X-ray contrast. Suitable materials for coating 30 would include gold and nickel.

Many variations, modifications and other applications of the illustrated embodiment may of course be made.

What is claimed is:

1. A method of implanting an artificial dental element into the bone structure of a human jaw, comprising: forming a hole in the bone structure; threading into said hole an externally threaded foundation pin having an internally threaded longitudinal bore open at its top and closed at its bottom, said foundation pin being formed at its top with an enlarged head protruding from the hole in the bone structure; severing said head; inserting a threaded cap into the top of said bore temporarily closing same; after a length of time sufficient to permit bone tissue growth to form around said foundation pin, removing said temporary threaded cap from said bore; and threading into said bore a second pin having a threaded shank at one end received in said bore and an artificial dental element at its opposite end.

2. The method as defined in claim 1, wherein said second pin is coated with a self-polymerizable plastic bonding agent before insertion into said bore.

3. The method as defined in claim 1, wherein said foundation pin is made of plastic and is coated on its external surface with a tissue-tolerant metallic layer.

4. A device for implanting an artificial dental element into the bone structure of a human jaw, comprising: an externally threaded foundation pin adapted to be implanted into a hole formed in the bone structure, said foundation pin being formed with an internally threaded longitudinal bore open at its top and closed at its bottom; said foundation pin being further formed with a severable enlarged head; a temporary threaded cap receivable in said bore for temporarily closing same; and a second pin having a threaded shank at one end adapted to be threaded into said bore of the foundation pin, said second pin carrying an artificial dental element at its opposite end.

References Cited
UNITED STATES PATENTS

| | | | |
|---|---|---|---|
| 2,857,670 | 10/1958 | Kiernam, Jr. | 32—10 |
| 3,435,526 | 4/1969 | Brancato | 32—10 |

ROBERT PESHOCK, Primary Examiner